United States Patent [19]

Olstowski et al.

[11] 4,282,387

[45] Aug. 4, 1981

[54] PROCESS FOR PREPARING POLYOLS

[75] Inventors: Franciszek Olstowski, Freeport; John L. Nafziger, Lake Jackson, both of Tex.

[73] Assignee: The Dow Chemical Company, Midland, Mich.

[21] Appl. No.: 107,242

[22] Filed: Dec. 26, 1979

[51] Int. Cl.$^3$ .............................................. C08G 65/28
[52] U.S. Cl. .................................... 568/618; 528/76; 528/413; 568/608; 568/619; 568/622; 568/589; 568/620; 568/623; 568/624
[58] Field of Search ............... 528/413; 568/620, 623, 568/608, 589, 618, 619, 622

[56] References Cited

U.S. PATENT DOCUMENTS

| | | | |
|---|---|---|---|
| 2,341,565 | 2/1944 | Lyman et al. | 252/48 |
| 2,923,690 | 2/1960 | Bedoit | 260/2 |
| 2,934,505 | 4/1960 | Gurgiolo | 528/413 |
| 3,031,439 | 4/1962 | Bailey | 528/393 |
| 3,285,968 | 11/1966 | Bradley | 568/613 |
| 3,755,197 | 8/1973 | Hsieh | 252/431 C |

OTHER PUBLICATIONS

Saunders & Frisch, Polyurethanes: Chemistry and Technology, Part I Chemistry, pp. 42 & 43 (1962).
Takahashi et al., "AlEt$_3$–Metal Soap Catalysts for Polymerization of Epoxides," J. Poly. Sci. (A-1) 1, 2015–2019 (1966).
Bailey et al., Poly (ethylene oxide), Academic Press, N.Y., 1976, pp. 13–14.

Primary Examiner—Earl A. Nielsen
Attorney, Agent, or Firm—J. G. Carter

[57] ABSTRACT

The invention describes an improved process for preparing polyols by reacting a mono-epoxy compound such as propylene oxide with a hydroxyl-containing initiator compound such as glycerine in the presence of a catalyst, the improvement being that the catalyst is added in the form of a calcium, strontium or barium salt of an organic acid such as acetic acid.

Polyols prepared by this process can be employed to prepare polyurethanes without removing the catalyst.

18 Claims, No Drawings

PROCESS FOR PREPARING POLYOLS

BACKGROUND OF THE INVENTION

Polyols for use in preparing polyurethanes are usually prepared by reacting an initiator compound having a plurality of active hydrogen atoms with an alkylene oxide in the presence of basic catalysts such as tertiary amines, sodium and potassium hydroxides and sodium wherein a sodium derivative, the alkaholate or alkoxide, is formed in situ. However, these catalysts must usually be removed by filtration and/or neutralization or other catalyst removal methods prior to use, particularly when prepolymers are to be prepared from such polyols.

A process has now been discovered whereby the aforementioned filtration and/or neutralization steps can be eliminated.

SUMMARY OF THE INVENTION

One aspect of the present invention is an improved process for preparing polyols by reacting at least one mono-epoxy-containing compound with an initiator compound containing at least one active hydrogen in the presence of a catalytic quantity of a catalyst and in the absence of a solvent other than the reactants; wherein said improvement comprises employing as the catalyst a calcium, barium or strontium salt of an organic acid having at least 2, preferably at least 3 and most preferably from about 6 to about 22 carbon atoms.

Another aspect of the present invention is a relatively low molecular weight compound having at least one, preferably from about 2 to about 8 and most preferably from about 2 to about 4 hydroxyl groups and at least 700, preferably from about 750 to about 50,000 and most preferably from about 1500 to about 30,000 ppm by weight of calcium, barium, strontium or mixtures thereof derived from the salt of an organic acid thereof having at least 2, preferably at least 3 and most preferably from about 6 to about 22 carbon atoms.

The term relatively low molecular weight means that the hydroxyl-containing compound can be increased in molecular weight by further reaction with a mono-epoxy compound such as an alkylene oxide, epihalohydrins or the like. These compounds generally have equivalent weights (the molecular weight divided by the hydroxyl functionality) of from about 45 to about 3000, preferably from about 80 to about 2500 and most preferably from about 150 to about 500.

The present invention also pertains to a polyol composition suitable for preparing polyurethanes which polyol composition comprises the unfiltered, unneutralized reaction product of (1) an active hydrogen-containing compound having a least two active hydrogen atoms, and (2) a mono-epoxy-containing compound in the presence of (3) a catalyst derived from a calcium, barium or strontium salt of an organic acid thereof having at least two, preferably at least three and most preferably from about 6 to about 22 carbon atoms or mixture of such salts wherein the catalyst is employed in quantities such that the resultant polyol contains less than about 20,000 ppm, preferably less than about 10,000 ppm and most preferably less than about 5000 ppm but at least 50 ppm by weight of calcium, barium and/or strontium.

These polyols most suitably have hydroxyl equivalent weights of from about 50 to about 12,500, preferably from about 90 to about 4000.

DESCRIPTION OF THE PREFERRED EMBODIMENTS

Suitable active hydrogen-containing compounds include the alcohols, glycols, low molecular weight polyols, glycerine, pentaerythritol, glucosides, sugars, starches, ammonia, amines, phenols, bisphenols mixtures thereof and the like.

Particularly suitable alcohols include the aliphatic alcohols having from 1 to about 18 carbon atoms such as for example, methanol, ethanol, propanol-1, propanol-2, butanol-1, butanol-2, hexanol-1 and the like.

Particularly suitable glycols include for example, ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol 1,4-pentylene glycol, 1,5-pentylene glycol, 1,6-pentylene glycol, neopentyl glycol, the various hexane diols, mixtures thereof and the like.

Particularly suitable phenols include phenol, resorcinol, catechol, hydroquinone, mixtures thereof and the like.

Particularly suitable bisphenols include those represented by the formula

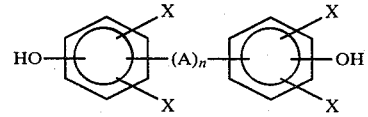

wherein A is a divalent hydrocarbon group having from 1 to about 8 carbon atoms,

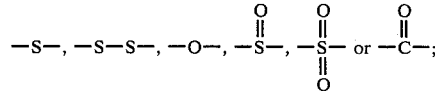

each X is independently hydrogen, chlorine or bromine and n has a value of zero or 1.

Particularly suitable low molecular weight polyglycols include the reaction product of an ether-free initiator compound having from 2 to about 8 hydroxyl groups and a mono-epoxy compound in quantities sufficient to provide from about 1 to about 4 moles of mono-epoxy compound for each hydroxyl group contained in the initiator compound.

Suitable mono-epoxy containing compounds include, for example, the alkylene oxides and halogenated and aryl substituted derivatives thereof, glycidyl ethers having from about 3 to about 20 carbon atoms, mixtures thereof and the like.

Particularly suitable alkylene oxides include, for example, ethylene oxide, propylene oxide, 1,2-butylene oxide, 2,3-butylene oxide, styrene oxide, epichlorohydrin, epibromohydrin, mixtures thereof and the like.

Particularly suitable glycidyl ethers include, for example, allyl glycidyl ether, phenyl glycidyl ether, butyl glycidyl ether, mixtures thereof and the like.

Particularly suitable calcium, barium or strontium catalysts which can be employed herein include, for example, calcium naphthenate, barium naphthenate, strontium naphthenate, calcium benzoate, barium benzoate, strontium benzoate, calcium acetate, barium acetate, strontium acetate, calcium propionate, barium propionate, strontium propionate, calcium citrate, calcium adipate, calcium ascorbate, calcium lactate, calcium stearate, calcium tartrate, calcium 2-ethyl hexoate, calcium neodecanoate, calcium tallates (tall oil acids), calcium salts of rosin acids, calcium salts of alkyl acidic acids and mixtures thereof.

When the polyols prepared by the process of the present invention are to be employed in the preparation of polyurethanes they should contain less than about 20,000, preferably less than about 10,000, and most preferably less than about 5000 ppm of the metal, Ba, Ca, Sr, or combinations thereof. Therefore when preparing the polyols, the initial concentration of the catalysts employed herein should be sufficient to catalyze the reaction but below that quantity which would cause the resultant product to contain greater than the aforementioned quantity of metal. Usually at least 750 ppm of the metal or combinations thereof is suitable for catalyzing the reactants.

When the reaction products are to be used as metal alkoxide containing compounds employed as, for example, lubricant additives they can contain larger quantities of the metals e.g. from about 750 to about 40,000, preferably from about 1500 to about 30,000 and most preferably up to about 4500 ppm. However, when the reactions products are to be used for preparing higher molecular weight polyols by reacting with additional quantities of epoxy compound, and the higher molecular weight compound is to be employed to prepare polyurethanes, then the maximum quantity of metal permitted is that which provides less than about 20,000 preferably less than about 10,000 and most preferably less than about 5000 ppm of metal in the final polyol composition.

While it is not entirely known how the mechanism of the reaction proceeds employing the catalysts of this invention, it is believed that an exchange takes place with the metal ion of the catalyst and the active hydrogen of the initiator compound, i.e. the active hydrogen-containing compound, thereby rendering the actual catalyst in the form of a metal alkoxide e.g. the Z—O—Me group wherein Me is the metal calcium, strontium or barium and Z is the residue of the initiator compound.

When employing a solid active hydrogen-containing compound such as sucrose as the initiator compound, it is often necessary to solubilize the compound such as sucrose with a liquid active hydrogen-containing compound such as, for example, glycerine.

The following examples are illustrative of the present invention but are not to be construed as to limiting the scope thereof.

In the following examples, the following catalysts were obtained from Mooney Chemicals, Inc.

Calcium Neo-Nap and calcium Nap-All (calcium naphthenate containing 6% Ca by wt.)

Calcium Ten-Cem (calcium neodecanoate containing 5% Ca by wt.)

Calcium Hex-Cem (calcium 2-ethyl hexanoate containing 5% Ca by wt.)

Magnesium Nap-All (magnesium naphthenate containing 10% Mg by wt.)

Zinc Nap-All (zinc naphthenate containing 8% Zn by wt.)

The following catalysts were obtained from the sources indicated.

Strontium naphthenate containing 6% Sr by weight is commercially availabe from Pfaltz & Baur, Inc.

Barium naphthenate containing 10% Ba by weight is commercially available from Shepherd Chemical Company.

Cadmium octoate containing 10% Cd by weight is commercially available from Research Organic/Inorganic Chemical Corp.

EXAMPLE 1

A mixture of 368 g of glycerine and 104 g of calcium naphthenate (containing 6% Ca by wt.) was placed in a dry stirred pressure reactor which was then purged with nitrogen several times. The mixture was then heated to 120° C. and 100 g of propylene oxide was added with rapid stirring. When an exotherm (rise in temperature) resulted and the pressure dropped, additional propylene oxide was added such that the temperature was maintained at 120° C.±5° resulting in a pressure of from 27 to 70 psig until 1550 to 1600 g of propylene oxide had been added. The product was a clear syrup having a weight average molecular weight of 450–500 as determined by gel permeation chromatography (gpc) and by hydroxyl content and contained 3048 ppm (calculated) of calcium.

EXAMPLE 2

A mixture of 220 g of calcium naphthenate (containing 6% Ca by wt.) and 180 g of polyoxyethylene glycol having an average molecular weight of about 414 was added to a stirred dry pressure reactor and purged several times with nitrogen. The temperature was increased to 120° C. and 100 g of a mixture consisting of 70 wt. % ethylene oxide and 30 wt. % propylene oxide was added. A sharp exotherm resulted and cooling was applied followed by the cautious addition of an additional 2500 g of the mixed oxides so as to control the temperature at about 120° C. The product was a dark homogeneous liquid which tended to form a skin on the surface when exposed to air, which contained a calculated quantity of 4400 ppm of Ca and which had an average molecular weight of 2900.

EXAMPLE 3

A series of three compositions were prepared employing in each (1) 6 g of the reaction product of glygerine with propylene oxide in a mole ratio respectively of 1 to 3 and which contained no residual catalyst, (2) one of 0.6 g of the naphthenate of (a) calcium containing 6% Ca by wt., (b) strontium containing 6% Sr by wt. and (c) barium containing 10% Ba by wt. and in each (3) 40 g of propylene oxide was added to stainless steel bombs which were rotated in a 112° C. autoclave overnight. The resultant products were clear, homogeneous, contained slight quantities of residual propylene oxide, contained respectively (on a calculated basis) 783 ppm of Ca, 783 ppm of Sr and 1300 ppm of Ba and a average molecular weight of 2100 by gel permeation chromatography (gpc).

EXAMPLE 4

A series of three compositions were prepared employing in each (1) 6.6 g of the triol employed in example 3, (2) 0.7 g of one of a calcium carboxylate of (a) neodecanoate containing 5% of Ca by wt., (b) 2-ethyl hexanoate containing 5% Ca by wt. and (c) acetate containing 23% of Ca by wt. and (3) 35 g of propylene oxide. Each of the mixtures of components were placed in stainless bombs which were rotated in a 112° C. autoclave for 18 hours.

Each of the resultant products were clear, homogeneous, contained slight quantities of residual propylene oxide, contained respectively (a) 827, (b) 827 and (c) 3800 ppm (calculated) by weight of Ca and a calculated average molecular weight respectively of (a) 1400, (b) 800 and (c) 2100.

COMPARATIVE EXPERIMENT A

In a manner similar to example 3, a mixture of 0.6 g of magnesium naphthenate containing 10% Mg by wt., 6 g of the triol and 40 g of propylene oxide was employed. The bomb was rotated in a 112° C. autoclave for 24 hours.

No propylene oxide appeared to have reacted with the triol and the magnesium naphthenate appeared as fine globules dispersed throughout the mixture.

COMPARATIVE EXPERIMENT B

In a manner similar to example 3, a mixture of 0.6 g of aluminum naphthenate containing 2.0% Al by wt., 6 g of the triol and 33.4 g of propylene oxide was employed. The bomb was rotated in a 130° C. autoclave overnight.

No propylene oxide appeared to have reacted with the triol and the aluminum naphthenate appeared as fine globules dispersed throughout the mixture.

COMPARATIVE EXPERIMENT C

In a manner similar to example 3, a mixture of 0.6 g of zinc naphthenate containing 8% Zn by wt., 6 g of the triol and 33.4 g of propylene oxide was employed. The bomb was rotated in a 130° C. autoclave overnight.

No propylene oxide appeared to have reacted with the triol and the zinc naphthenate appeared as fine globules dispersed throughout the mixture.

COMPARATIVE EXPERIMENT D

In a manner similar to example 3, a mixture of 0.6 g of cadmium octoate containing 10% Cd by wt., 6 g of the triol and 33.4 g of propylene oxide was employed. The bomb was rotated in a 130° C. autoclave overnight.

No propylene oxide appeared to have reacted with the triol and the cadmium octoate appeared as fine globules dispersed throughout the mixture.

EXAMPLE 5

In a manner similar to example 3, a mixture of 10 g of the triol, 1 g of calcium naphthenate containing 6% Ca by wt., 1 g of strontium naphthenate containing 6% Sr by wt. and 15 g of propylene oxide was employed. The bomb was rotated in a 115° C. autoclave for 2 hours.

The resultant product was clear, homogeneous, contained no residual propylene oxide, contained ppm 2400 Ca, ppm 2400 Sr by wt. (calculated) and had an average molecular weight of 650 (calculated).

EXAMPLE 6

In a manner similar to example 3, a mixture of 10 g of calcium naphthenate containing 60,000 ppm Ca by wt., 0.1 g of the triol and 15 g of propylene oxide was employed. The bomb was rotated in a 112° C. autoclave overnight.

The resultant product was clear, homogeneous, contained no propylene oxide and contained a calculated quantity of 24,000 ppm of Ca.

EXAMPLE 7

In a manner similar to example 3, a mixture of 0.1 g of calcium naphthenate containing 6% Ca by wt., 10 g of the triol and 15 g of propylene oxide was employed. The bomb was rotated in an autoclave at 112° C. overnight.

The resultant product was clear, homogeneous, contained a slight residual quantity of propylene oxide, had a calculated average molecular weight of 650 and contained 240 ppm of Ca by wt.

EXAMPLE 8

To a one gallon, electrically heated, stirred reactor was added 390 grams of an 87 equivalent weight propylene oxide adduct onto glycerine polyether triol from which essentially all of the catalyst (KOH) had been removed and 9 grams of a calcium based liquid carboxylate essentially comprising a calcium salt of naphthenic acid (Calcium Neo-Nap commercially available from Mooney Chemicals, Inc.) containing 6 wt % calcium.

The reactor contents were heated to a temperature of about 135° C. and propylene oxide was fed into a stirred reactor and the reactor pressure was maintained between about 50 psig and about 70 psig by controlling the propylene oxide feed rate.

After about 13 hours of run time, a total of 1020 grams of propylene oxide had been fed to the reactor.

A total of 1404 grams of pale yellow fluid product was drained from the reactor which when analyzed by gel permeation chromatography was found to exhibit a narrow range of molecular weights centering about a value equivalent to 800 mol. wt. A wet method hydroxyl analysis of this product showed a hydroxyl content equivalent to an average molecular weight value of 894. The product contained about 385 ppm of Ca (calculated).

EXAMPLE 9

To the 1 gallon reactor described in example 1 was added 501 grams of product from example 8 and a further addition of 9.7 grams of the same calcium based liquid carboxylate. Maintaining the reactor contents at about 135° C., a further 900 grams of propylene oxide was fed to the reactor (reactor pressure was generally maintained between about 50 and 70 psig) over an 11 hour interval. An analysis of the reactor product by gel permeation chromatography (gpc) showed a weight average molecular weight of 2400. Since a 3000 mol. wt. product was desired, further additions of propylene oxide were made to the reactor.

The polyol product was analyzed by wet method and was found to contain 1.84 wt % OH (924 equivalent weight) and exhibited a pH value of 10.85 and contained about 586 ppm of Ca by wt. (calculated).

This crude polyol product, without separating out the calcium values and without further filtration or neutralization was compared directly with a commercially available glycerine initiated propoxylated polyether polyol having an equivalent weight of 982 and essentially no residual catalyst in forming a "water blown" slabstock formulation flexible polyurethane foam product.

In a formulation shown below, the behavior of the calcium containing polyol was virtually indistinguishable from the commercial polyol and the foamed products appeared identical.

| Formulation | Commercial Polyol (g) (Comparative) | Polyol of Ex. 9 (g) |
| --- | --- | --- |
| Commercial polyol | 100 | — |
| Polyol of Ex. 9 | — | 100 |
| H₂O | 4.3 | 4.3 |
| Silicone Surfactant | 1.0 | 1.0 |
| Amine Catalyst | 0.1 | 0.1 |
| Tin Catalyst (T-9) | 0.15 | 0.15 |
| Toluene Diisocyanate Index* | 108 | 108 |
| TDI | 54.5 | 55.1 |
| Cream time (seconds) | 17 | 18 |
| Foam Rise Time (seconds) | 113 | 117 |

*Index is the number of NCO groups per 100 OH groups.

EXAMPLE 10

To a 20 gallon heated jacket, stirred, glasslined, steel reactor was added 4000 grams of an 87 equivalent weight propoxylated glycerine based initiator containing essentially no residual catalyst and 200 grams of a liquid calcium naphthenate (Calcium Neo-Nap) containing 6 wt % calcium. Propylene oxide was fed into this reactor maintained at about 138° C. for a period of about 32 hours until a total of about 170 pounds of propylene oxide was fed into the reactor. The liquid reactor product was analyzed by wet method to contain 1.73 wt % OH which calculates (17÷0.0173) to an equivalent weight of 983. The triol contained 147 ppm of Ca (calculated).

The unfiltered and un-neutralized polyol from the above run was compared with the same 982 eq. wt. commercial polyol employed in example 9 at the box foam scale in the formulation of slabstock flexible polyurethane foam. The formulation and the resulting foam properties are shown in the table below:

|  | Commercial Polyol (Comparative) | Polyol of Ex. 10 (Crude Fluid from Reactor) |
| --- | --- | --- |
| Formulation |  |  |
| Commercial polyol, grams | 1000 | — |
| Polyol of Ex. 10, grams | — | 1000 |
| H₂O, grams | 43 | 43 |
| Surfactant (L540), grams | 10 | 10 |
| Amine Catalyst (Niax A-1), grams | 1.0 | 1.0 |
| Tin Catalyst (T-9), grams | 2.50 | 2.75 |
| Isocyanate Index | 108 | 108 |
| Toluene Diisocyanate, grams | 544 | 544 |
| Foam Rise Time (seconds) | 86 | 81 |
| Foam Properties |  |  |
| Density (lbs/ft³) | 1.43 | 1.46 |
| Tensile (psi) | 12.6 | 11.8 |
| Elongation (%) | 137 | 124 |
| Tear (pli) | 1.77 | 1.67 |
| ILD 25% | 48.6 | 47.6 |
| ILD 65% | 79.2 | 83.2 |
| Modulus | 1.63 | 1.75 |
| Air Flow | 5.3 | 3.8 |

EXAMPLE 11

A series of flexible polyurethane foams were prepared by blending the polyisocyanate into a mixture of the other components and then pouring the mixture into a one-half gallon (1.9 l) ice cream carton. The formulations and observations are given below.

FOAM #1 (CONTROL—commercial polyol containing essentially no residual catalyst).

100 parts of a polyether triol having a % OH of about 1.72.
4.5 parts of water
0.1 parts of Niax A-1 catalyst
0.175 parts of T-9 catalyst
1.0 parts of L540 silicone surfactant sufficient parts of an 80/20 mixture of 2,4-/2,6-toluene diisocyanate to provide an index of 110.

The foam had a cream time of 11.2 seconds and a rise time of 103 seconds with desirable blow-off.

FOAM #2 (COMPARATIVE-polyol containing 4100 ppm K)

Same as in Foam #1 except that the polyol contained 4100 ppm of potassium.

The cream time was 2 seconds and the rise time was 39.4 seconds with blow-off. However, this foam sighed, shrank in the middle, after completion of foaming.

FOAM #3 (COMPARATIVE-polyol containing 410 ppm K)

Same as in Foam #1 except that the polyol contained 410 ppm of potassium.

The cream time was 8.4 seconds and the rise time was 95 seconds with no blow-off.

FOAM #4 (COMPARATIVE-polyol containing 205 ppm K)

Same as in Foam #1 except that the polyol contained 205 ppm potassium.

The cream time was 11 seconds and the foam did not exhibit blow-off after rising.

FOAM #5 (COMPARATIVE-polyol containing 100 ppm K)

Same as in Foam #1 except that the polyol contained 100 ppm of potassium.

The cream time was 11.2 seconds and the rise time was 113.8 seconds with only a relatively small blow-off.

FOAM #6 (COMPARATIVE-polyol containing 50 ppm K)

Same as in Foam #1 except that the polyol contained 50 ppm potassium.

The cream time was 11.3 seconds and the rise time was 106 seconds with a desirable blow-off as in Foam #1.

FOAM #7 (PRESENT INVENTION-polyol containing 180 ppm calcium)

Same as in Foam #1 except that the polyol containing 180 ppm calcium.

The cream time was 17 seconds and the rise time was 120 seconds with a blow-off similar to that of Foam #1.

FOAM #8 (PRESENT INVENTION-polyol containing 430 ppm Ca)

Same as in Foam #1 except that the polyol contained 430 ppm calcium.

The cream time was 17 seconds and the rise time was 118 seconds with a blow-off as in Foam #1.

FOAM #9 (PRESENT INVENTION-polyol containing 4280 ppm Ca)

Same as in Foam #1 except that the polyol contained 4280 ppm of calcium.

The cream time was 18 seconds, the rise time was 122.4 seconds with a blow-off similar to that of Foam #1.

Each of the above prepared foams were post cured in an oven at 100° C. for 15 minutes. The foams were then cut open for visual inspection and evaluation thereof.

The following Table gives the evaluation of the foams.

| Foam # | QUANTITY OF K or Ca | OBSERVATIONS |
|---|---|---|
| 1 (CONTROL) | essentially none | excellent quality |
| 2 (COMPARATIVE) | 4100 ppm K | Foam contained splits, was dead tight and scorched |
| 3 (COMPARATIVE) | 410 ppm K | Foam was grossly pruned (less than ½ its original volume) |
| 4 (COMPARATIVE) | 205 ppm K | Foam was dead, exhibited poor finger nail and was tight and discolored. |
| 5 (COMPARATIVE) | 100 ppm K | Foam was discolored and slightly tight |
| 6 (COMPARATIVE) | 50 ppm K | foam was slightly more tight than the control (Foam #1) but was acceptable |
| 7 (PRESENT INVENTION) | 180 ppm Ca | Foam was better than #4 and #5, had open cells, fine cells and was as good as the control |
| 8 (PRESENT INVENTION) | 430 ppm Ca | Foam was acceptable |
| 9 (PRESENT INVENTION) | 4280 ppm Ca | No scorch, no splits, was not dead, slightly tight but had open cells |

Following is a ranking of the foams with 1 being the best and 10 being the worst and an indication as to whether or not the foam would be acceptable for most uses although not necessarily the most desirable.

| FOAM NO. | RANKING | ACCEPTABLE (A)/NOT ACCEPTABLE (NA) |
|---|---|---|
| 1 (CONTROL) | 1 | A |
| 7 (PRESENT INVENTION) | 2 | A |
| 6 (COMPARATIVE) | 3 | A |
| 8 (PRESENT INVENTION) | 4 | A |
| 5 (COMPARATIVE) | 5 | A |
| 9 (PRESENT INVENTION) | 6 | marginal |
| 4 (COMPARATIVE) | 7 | NA |
| 3 & 2 (COMPARATIVE) | 10 | NA |

EXAMPLE 12

To a 100 gram sample of a 983 eq. wt. triol prepared in example 10 was added 37.4 grams of 80/20 toluene diisocyanate and blended to yield an isocyanate terminated "prepolymer" containing 10 wt. % unreacted NCO. A portion of this prepolymer was added to a Gardner Vertical Viscosimeter (ASTM "Timer" tubes) and the initial "bubble rise time" was found to be about 20 seconds at a temperature of about 27° C. This sample of prepolymer was maintained in a laboratory atmosphere for 73 days at which time the bubble rise time was measured to be 55 seconds.

COMPARATIVE EXPERIMENT E

In a manner similar to Example 12, a prepolymer was prepared employing the 982 eq. wt. commercial polyol mentioned in examples 9 and 10 instead of the polyol of the present invention as prepared in example 10. This prepolymer had an initial bubble rise time at a temperature of about 27° C. of 18 seconds and after 67 days and bubble rise time was 36 seconds.

EXAMPLE 13

A. PRESENT INVENTION-preparation of a prepolymer from a polyol containing 181 ppm Ca.

To a 100 gram sample of a 983 equivalent weight glycerine initiated polyoxypropylene triol containing 0.04% water by weight and 181 ppm residual calcium which polyol was prepared in the presence of a calcium carboxylate catalyst (Calcium Neo-Nap a synthetic calcium naphthenate containing 6% calcium by weight, commercially available from Mooney Chemicals, Inc.) and 33.6 grams of 80/20 toluene diisocyanate (a mixture of 80% 2,4 and 20% 2,6-isomers) so as to prepare a prepolymer theoretically containing 10% NCO by weight. The sample was sealed and agitated to mix the contents. There was no exotherm observed within the first hour.

One week after preparing this prepolymer, a portion of this prepolymer was added to a Gardner Vertical Viscosimeter (ASTM "Timer" tube) and the bubble rise time was observed to be about 22 seconds at a temperature of 27° C.

B. COMPARATIVE EXPERIMENT-PREPARATION OF A PREPOLYMER FROM A POLYOL CONTAINING POTASSIUM

To a 100 gram sample of a 983 eq. wt. triol containing 136 ppm of residual potassium and 0.038% water by weight was added 33.6 grams of 80/20 toluene diisocyanate to theoretically form an NCO terminated prepolymer having an NCO content of about 10% by weight.

This sample was sealed and agitated to mix the contents and within several minutes, a distinct exotherm was detected and within about 30 minutes, a non-flowing gel-like product was formed.

EXAMPLE 14

To the 1 gallon stirred reactor described in example 8 was added 401 grams of an 87 eq. wt. triol (identical to that employed in example 8) and 10 grams of calcium stearate containing 6.6% Ca by wt. Maintaining the reactor at a temperature of about 136° C., a total of 1050 grams of propylene oxide was fed over a period of 11 hours. At the end of this period 1448 grams of a liquid product was drained from the reactor and analyzed, by gpc techniques, to show a weight average molecular weight of 800. The product was calculated to contain 450 ppm Ca by wt.

EXAMPLE 15

To the same 1 gal. reactor employed in example 8 was added 485 grams of the same 87 eq. wt. triol and 25 grams of the calcium naphthenate described in example 8. With the reactor maintained in the temperature range of 130° C. to 138° C., a total of 1570 grams of propylene oxide was fed to the reactor in about a ten hour interval. At this time, the reactor was drained of its product;

The autoclave runs are summarized in the table below:

| Catalyst | Hydroxyl Initiator | Alkylene Oxide | Temp (°C.) | Time (hrs) | Product Average Molecular Weight | Calculated Ca content |
|---|---|---|---|---|---|---|
| CaAcetate (0.5g)[1] | 260 MW triol (10g) | P.O.(10g) | 105 | 20 | ~800 | 5540 ppm |
| CaBenzoate (0.5g)[2] | 260 MW triol (10g) | " | " | " | " | 2600 ppm |
| Ca 2-ethyl hexanoate (1g)[3] | 260 MW triol (10g) | " | 110 | 16 | " | 2440 ppm |
| CaNeodecanoate (2g)[4] | 260 MW triol (10g) | " | " | " | " | 4545 ppm |
| CaPropionate (0.5g)[5] | 260 MW triol (10g) | " | " | " | " | 4780 ppm |
| CaStearate (0.5g)[6] | 260 MW triol (10g) | " | " | " | " | 1610 ppm |

[1]The calcium acetate employed contained 22.7% Ca by wt.
[2]The calcium benzoate employed contained 10.6% Ca by wt.
[3]The calcium 2-ethyl hexanoate contained 5% Ca by wt.
[4]The calcium neodecanoate contained 5% Ca by wt.
[5]The calcium propionate contained 19.6% Ca by wt.
[6]The calcium stearate contained 6.6% Ca by wt.

2088 grams of liquid product was recovered which was analyzed to contain 4.72 wt. % OH (equivalent to an average molecular weight of 1080). On a calculated basis, the product contained 721 ppm of Ca.

Then 807 grams of this product was re-introduced into the 1 gal. reactor along with an addition of 13 grams of the calcium naphthenate material. A further 1670 grams of propylene oxide was polymerized onto the polyether polyol in the reactor over a period of about 18 hours at an average temperature of 135° C. Then this reactor was re-drained and 2482 grams of a liquid polyol was recovered. Analysis of this polyol showed an OH concentration of 1.82 wt. % (equivalent to an average molecular weight of about 2800). On a calculated basis the product contained 547 ppm of Ca.

Next 895 grams of the above polyol product (cont. 1.82 wt. % OH) was poured back into the reactor along with an additional 30 grams of calcium naphthenate material. A further addition of 1050 grams propylene oxide was polymerized onto the polyol in the reactor over the next 9½ hours at a reactor temperature ranging from 130° C. to 139° C. At the end of this period, 1953 grams of a polyol product was recovered from the reactor. Analysis of the polyol showed that the OH concentration had dropped to 0.98 wt. % (equivalent to a triol having an average molecular weight of about 5200) and an unsaturated level equivalent to 175 ppm C=C. The product contained, on a calculated basis, 1159 ppm of Ca.

EXAMPLE 16

Several alkaline earth carboxylates were tested as catalysts for polymerizing propylene oxide onto an 87 equivalent weight (molecular weight of about 260) triol (propoxylated glycerine) as described in example 8. The reaction was carried out in 4 ounce citrate bottles heated in a rotating steam autoclave. After the designed reaction time, the liquid products were examined by gel permeation chromatography techniques. Those carboxylates that effected propylene oxide polymerization onto the hydroxyl initiator yielded a polyol product having a narrow molecular weight range centering about 800 with a total disappearance of the initiating (~260 mw) triol.

EXAMPLE 17

A series of three preparations with a high metal content were prepared employing (1) the reaction product of glycerine with propylene oxide in a mole ratio of 1 to 3 respectively as the initiator, (2) calcium naphthenate containing 6% Ca as the catalyst and independently epichlorohydrin, propylene oxide (PO) and styrene oxide (SO) as the oxide.

The three mixtures were placed in vials capable of withstanding moderate pressure changes and heated while shaking to 110° C. The quantities and reaction times were as follows:

| RUN NO. | INITIATOR grams | CATALYST grams | OXIDE type/grams | REACTION TIME |
|---|---|---|---|---|
| A | 2.6 | 0.67 | EPI/2.6 | overnight |
| B | 1.3 | 3.33 | PO/1.5 | 2 hours |
| C | 2.6 | 3.33 | SO/2.4 | 2 hours |

Examination of the vials by gel permeation chromatography showed that the oxides reacted with both the initiator and naphthenate to form alkoxides having Ca metal contents for runs A, B and C respectively of 6600 ppm, 32,600 ppm and 24,000 ppm.

EXAMPLE 18

A mixture of 1.76 grams of calcium acetate and 1.92 grams of a triol consisting of glycerine reacted with 3 equivalents of propylene oxide was placed in a vial capable of withstanding moderate pressure changes and heated to 110° with shaking. Propylene oxide was added in 0.6 gram portions, starting with 4 portions initially, and one portion thereafter as the reaction appeared complete, until 17 portions (10.2 grams) had been added and the solution was essentially clear with no free propylene oxide. Ca metal content of the product fluid was 50,000 ppm.

EXAMPLE 19

A series of four preparations were each run for 2½ hours, 2¾ hours and 3½ hours in stainless steel bombs in a 130° C. rotating autoclave. The compositions were as follows:

(1) 0.3 g calcium napthenate, 0.3 g of a triol initiator consisting of glycerine reacted with propylene oxide in a mole ratio of 1 to 3 respectively and 46.7 g of propylene oxide.
(2) 0.3 g calcium naphthenate and 49.7 g propylene oxide with no triol initiator.
(3) 0.05 g potassium hydroxide, 3.0 g of the triol initiator described above and 46.7 g of propylene oxide.
(4) 0.05 g potassium hydroxide and 50 g propylene oxide with no triol initiator.

The results were as follows

| Run No. | 2½ Hours Wt. Avg. Mol. Wt.[1] | 2½ Hours PO unreacted | 2¾ Hours Wt. Avg. Mol. Wt.[1] | 2¾ Hours PO unreacted | 3½ Hours Wt. Avg. Mol. Wt.[2] | 3½ Hours PO unreacted | 3½ Hours PPM unsaturation | Wt. Avg. MW/ No. Avg. MW |
|---|---|---|---|---|---|---|---|---|
| 1[3] | 4,200 | 8% | 4,500 | 0 | 3,256 | 0 | 64 | 1.089 |
| 2[4] | 43,000 | 10% | 43,000 | 5% | 36,000 | 20–25% | 127 | 1.773 |
| 3[4] | 3,800 | 15% | 3,700 | 5% | 2,240 | 5% | 264 | 1.467 |
| 4[4] | 2,000 | ~40% | 2,000 | >40% | 1,590 | 15% | 3,000 | 1.31 |

[1]Determined on a gel permeation chromatograph within the research laboratory.
[2]Determined on a gel permeation chromatograph within an analytical laboratory.
[3]Present invention.
[4]Comparative.

The combination of calcium catalysis with an active hydrogen containing initiator, the present invention resulted in (i) faster reaction of propylene oxide; (ii) lower unsaturation content in the reaction product and (iii) narrower molecular weight distribution as indicated by the lower value of wt.avg.MW/No.avg.MW to that obtained in the comparative runs 2, 3 and 4.

We claim:

1. In a process for preparing active hydrogen-containing polymers having hydroxyl equivalent weights from about 50 to about 12,500 by reacting a mono-epoxy-containing compound with a compound containing at least one active hydrogen in the presence of a catalytic quantity of a catalyst, and in the absence of a solvent or diluent other than the reactants and reaction products; the improvement wherein the catalyst is added in the form of an organic carboxylic acid salt of calcium, barium, strontium, or mixture thereof and wherein said organic acid has at least 2 carbon atoms.

2. The process of claim 1 wherein the active hydrogen-containing compound is an aliphatic hydroxyl-containing compound having from 1 to about 8 hydroxyl groups and from 1 to about 18 carbon atoms, and the epoxy compound is an alkylene oxide having from 2 to about 4 carbon atoms.

3. The process of claim 2 wherein said organic carboxylic acid has from about 6 to about 22 carbon atoms or mixtures thereof.

4. The process of claim 2 wherein the organic carboxylic acid salt is an acetate, propionate, benzoate, naphthenate, octanoate, neodecanoate, stearate or mixture of any two or more thereof.

5. In a process for preparing polymers containing active hydrogen atoms in the form of hydroxyl groups and having hydroxyl equivalent weights from about 50 to about 12,500 by reacting a compound having at least one active hydrogen atom with a mono-epoxy-containing compound in the presence of a catalytic quantity of catalyst and in the absence of a solvent or diluent other than the reactants or reaction products, followed by the removal and/or neutralization of the catalyst; the improvement which comprises adding the catalyst in the form of the calcium, barium or strontium salt of an organic carboxylic acid having at least 2 carbon atoms or mixture thereof and in a catalytic quantity such that the quantity of calcium, barium, strontium or mixture thereof in the resultant reaction product is less than about 5000 ppm, thereby eliminating the necessity of the catalyst removal and/or neutralization step.

6. The process of claim 5 wherein the active hydrogen-containing compound is an aliphatic hydroxyl-containing compound having from 1 to about 8 hydroxyl groups and from 1 to about 18 carbon atoms, and the epoxy compound is an alkylene oxide having from 2 to about 4 carbon atoms.

7. The process of claim 6 wherein said organic carboxylic acid has from about 6 to about 22 carbon atoms or mixtures thereof.

8. The process of claim 6 wherein the organic carboxylic acid salt is an acetate, propionate, benzoate, naphthenate, octanoate, neodecanoate, stearate or mixture of any two or more thereof.

9. A composition comprising
   (1) a hydroxyl containing polymer having hydroxyl equivalent weights from about 50 to about 12,500 prepared by reacting a compound having from 2 to about 8 active hydrogen atoms with a mono-epoxy-containing compound and
   (2) at least about 700 ppm of calcium, barium, strontium or mixture thereof added in the form of the salt of a carboxylic acid thereof said acid having at least 2 carbon atoms.

10. The composition of claim 9 wherein (i) the active hydrogen-containing compound is an aliphatic hydroxyl-containing compound having from 2 to about 4 hydroxyl groups and from 1 to about 18 carbon atoms, (ii) the epoxy compound is an alkylene oxide having from 2 to about 4 carbon atoms, (iii) wherein said carboxylic acid has at least 2 carbon atoms and (iv) the composition contains from about 750 ppm to about 50,000 ppm of calcium, barium, strontium, or mixture thereof.

11. The composition of claim 10 wherein said carboxylic acid has from about 6 to about 22 carbon atoms or mixtures thereof.

12. The composition of claim 10 wherein (i) the carboxylic acid salt is an acetate, propionate, benzoate, naphthenate, octanoate, neodecanoate, stearate or mixture thereof and (ii) the compositior contains from about 1500 ppm to about 30,000 ppm of calcium, barium, strontium or mixture therof.

13. A polyol composition suitable for preparing polyurethanes which polyol composition comprises the unfiltered, unneutralized reaction product of
   (1) an active hydrogen-containing compound having a least two active hydrogen atoms, and (2) a mono-epoxy-containing compound in the presence of (3) a catalyst added in the form of a calcium, barium or strontium salt of an organic carboxylic acid thereof, said acid having at least two carbon atoms or mixture of such salts wherein the catalyst is employed in quantities such that the resultant polyol contains less than about 20,000 ppm but at least 50 ppm by weight of calcium, barium, strontium or mixture thereof wherein said polyol reaction product has a hydroxyl equivalent of from about 50 to about 12,500.

14. The polyol composition of claim 13 wherein (i) component (1) contains two or three hydroxyl groups, (ii) component (2) is an alkylene oxide or mixture of alkylene oxides having from 2 to 4 carbon atoms, (iii) the acid of component (3) has from about 6 to about 22 carbon atoms and (iv) the total quantity of calcium, barium and strontium is from about 50 ppm to about 10,000 ppm.

15. The polyol composition of claim 14 wherein (i) component (1) is selected from the group consisting of ethylene glycol, propylene glycol, butylene glycol, glycerine, trimethylol propane, an adduct of glycerine and propylene oxide in a mole ratio respectively from about 1:1 to about 1:6 and mixtures thereof, (ii) the total quantity of calcium, barium and strontium is from about 50 ppm to about 5000 ppm and (iii) the acid of component (3) is naphthenic, acetic, benzoic, octanoic, neodecanoic, stearic or mixture of any two or more thereof.

16. The process of claims 1, 2, 4, 5, 6 or 8 wherein the catalyst is an acetate.

17. The process of claims 1, 2, 3, 4, 5, 6, 7, or 8 wherein the catalyst is a naphthenate.

18. The composition of claims 9, 10, 12, 13, 14 or 15 wherein the catalyst is an acetate, naphthenate or mixture thereof.

* * * * *

UNITED STATES PATENT AND TRADEMARK OFFICE
CERTIFICATE OF CORRECTION

PATENT NO. : 4,282,387
DATED : August 4, 1981
INVENTOR(S) : Franciszek Olstowski and John L. Nafziger It is certified that error appears in the above—identified patent and that said Letters Patent is hereby corrected as shown below:

Col. 4, line 2, correct "availabe" to ---available---.

Col. 4, line 46, correct "glyge-" to ---glyce- ---.

Col. 9, line 3 of the first table, insert a comma ---,--- after the word dead.

Col. 10, line 10, change the word "and" to ---the---.

Col. 11, line 51, correct "unsaturated" to ---unsaturation---.

Signed and Sealed this

Eighth Day of December 1981

[SEAL]

Attest:

GERALD J. MOSSINGHOFF

Attesting Officer   Commissioner of Patents and Trademarks